United States Patent
Humphreys (10) Patent No.: US 10,948,128 B2
(45) Date of Patent: Mar. 16, 2021

(54) GOLF BALL RANGE FINDER

(71) Applicant: Rory Humphreys, Diamond Springs, CA (US)

(72) Inventor: Rory Humphreys, Diamond Springs, CA (US)

(*) Notice: Subject to any disclaimer, the term of this patent is extended or adjusted under 35 U.S.C. 154(b) by 485 days.

(21) Appl. No.: 16/036,292

(22) Filed: Jul. 16, 2018

(65) Prior Publication Data

US 2020/0018438 A1     Jan. 16, 2020

(51) Int. Cl.

| G01C 3/08 | (2006.01) |
|---|---|
| F16M 13/02 | (2006.01) |
| A63B 24/00 | (2006.01) |
| G01S 17/88 | (2006.01) |
| F16M 11/08 | (2006.01) |
| A63B 102/32 | (2015.01) |

(52) U.S. Cl.
CPC ....... *F16M 13/022* (2013.01); *A63B 24/0021* (2013.01); *F16M 11/08* (2013.01); *G01S 17/88* (2013.01); *A63B 2024/0053* (2013.01); *A63B 2102/32* (2015.10); *F16M 2200/022* (2013.01)

(58) Field of Classification Search
CPC ........ F16M 11/10; F16M 11/18; F16M 11/24; F16M 11/2014; F16M 11/08; F16M 2200/022; F16M 2200/027; G01S 17/08; G01S 7/4813; A63B 24/0021; A63B 2225/02; A63B 2225/093; A63B 2225/09; A63B 2024/0028; A63B 2024/0053; A63B 2220/20; A63B 2102/32; A63B 71/0036
USPC .......................................... 356/5.01
See application file for complete search history.

(56) References Cited

U.S. PATENT DOCUMENTS

| 6,102,817 A * | 8/2000 | Boswell ................. A63B 57/00 473/407 |
|---|---|---|
| 7,708,658 B2 * | 5/2010 | McInerney ............ A63B 57/40 473/407 |
| 8,657,699 B2 * | 2/2014 | Falls ...................... A63B 57/00 473/257 |
| 8,801,546 B2 * | 8/2014 | Roark .................. A63B 67/068 473/407 |

FOREIGN PATENT DOCUMENTS

KR     2009112384     * 10/2009     ............. A63B 69/36

* cited by examiner

*Primary Examiner* — Mark Hellner
(74) *Attorney, Agent, or Firm* — Mark S. Hubert (57) ABSTRACT

A golf ball range finder that rests in either a custom leveled and aligned pin, or a standard pin of a golf green, and rotationally and vertically aligns a laser range finder onto all the golf balls in the vicinity. The golf ball range finder has mechanisms to align it vertically, horizontally and to adjust for differences in the depth of the pin so that its rotational axis resides collinear with a vertical axis passing through the midpoint of the pin.

15 Claims, 10 Drawing Sheets

GOLF BALL RANGE FINDER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a device for determining the distance from the center of a golf ball hole to a golf ball.

BACKGROUND

Golf has become a game of gambling for the wealthy. Many of the games are based on attaining the close proximity to the golf ball hole. The problem is when a lot of money is at stake, the art of measuring may be brought into question.

Heretofore, there has been a plethora of measuring devices utilized, however most are only accurate to within a ¼ of an inch or so. This is because there is has not been a good way to establish the center of the golf ball hole, compensate for sag in the measuring device or account for non mid center-ball measurements. This inaccuracy in measurement is not acceptable in high stake situations Thus, a more controllable and consistent measuring device that can accurately measure the distance between a golf ball and the center of a golf ball hole, regardless of the location or distance of the ball from the golf ball hole, would fulfill a long felt need in the sport of golf. This new invention utilizes and combines known and new technologies in a unique and novel configuration to overcome the aforementioned problems and accomplish this.

BRIEF SUMMARY

In accordance with various embodiments, a golf ball range finder that offers a 360 degree range determination about the vertical, central axis of the golf ball hole is provided.

In one aspect, a device for allowing the accurate laser distance measurement from the vertical centerline of the golf ball hole to the midpoint of a golf ball regardless of the distance the ball is from the hole, is provided.

In another aspect, a pivotable laser range finder for determining accurate distances from a golf ball hole to any object, and that may be used in a custom golf ball hole or a standard golf ball hole, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "golf ball hole" refers to the target hole for a golf ball on the green in a game of golf. These golf ball holes are round cross sectional, cylindrical inserts fitted therein cylindrical bores in the ground. These inserts are generally made of aluminum or a white metal having their top perimeter edge slightly below the grass line. The golf ball range finder has an embodiment that operates with the standard golf ball hole and another embodiment that operates with a custom golf ball hole having a custom, vertically aligned and positioned cylindrical insert.

The present invention relates to a novel design for a device capable of measuring the distance to any object, in all directions, with a laser ranger finder, from a reference point vertically aligned with the center of a golf ball hole. The device has alignment and calibration capability. There is a custom golf ball hole and a standard golf ball hole version of the golf ball range finder. (These embodiments are termed the standard golf ball range finder and the custom golf ball range finder.) These two embodiments differ in golf ball holes that they are mounted in and how the vertical alignment of the device is accomplished from these golf ball holes.

Figure 1:
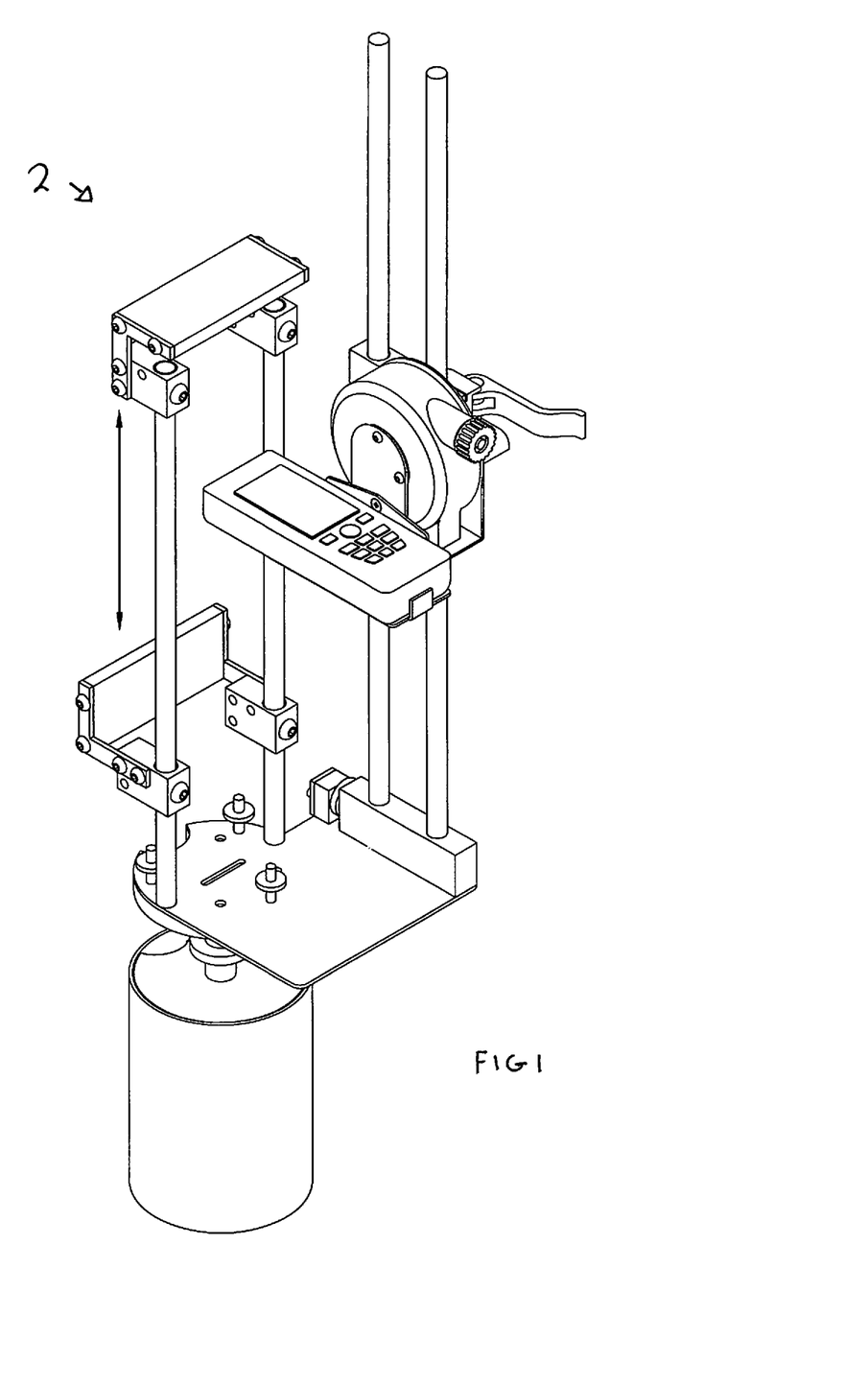
FIG. 1 is a top perspective view of the golf ball ranger finder for use with the custom golf ball hole.

Looking at FIG. 1, the assembled custom golf ball range finder 2 *f* can best be seen. The calibration platform 49 is shown as moveable between its calibration configuration (lower position) and its handle configuration (upper position).

Figure 2:
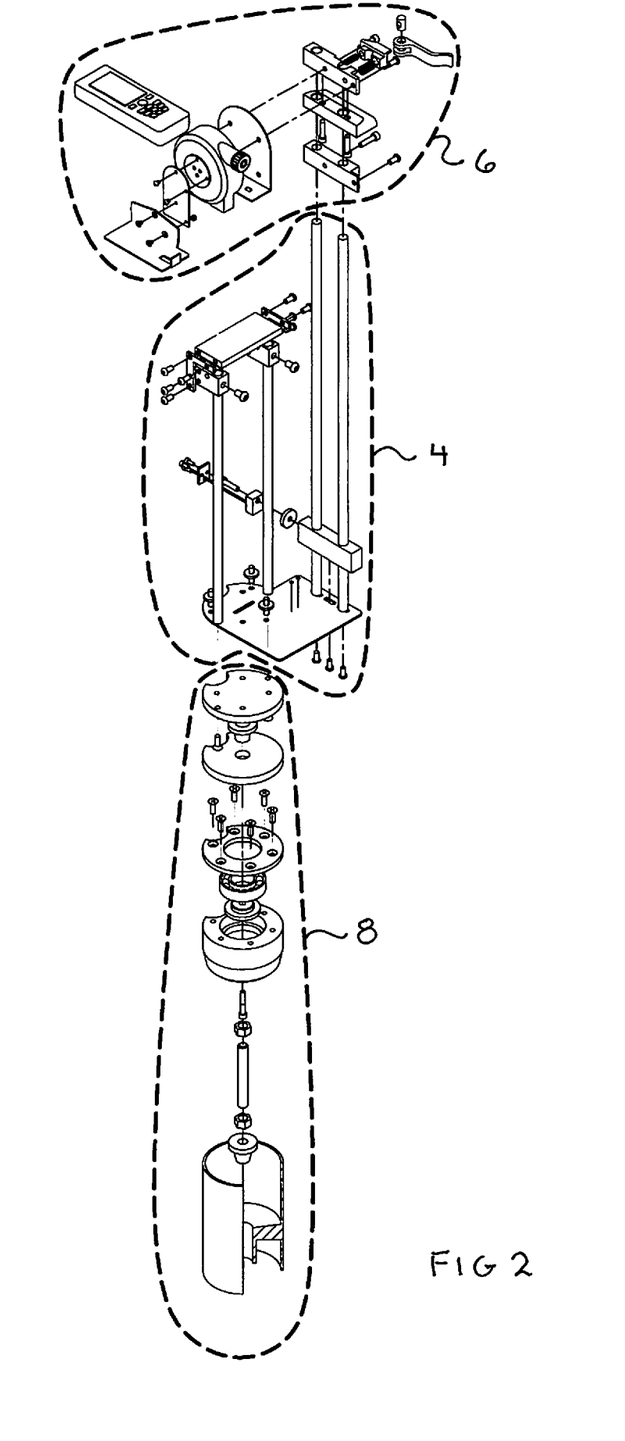
FIG. 2 is an exploded view of the golf ball range finder for use with the custom golf ball hole.

Looking at FIG. 2 it can be seen that the custom golf ball range finder 2 is made of three separable components: the height adjustment frame 4 (FIGS. 2 and 3), the measurement frame 6 (FIGS. 2 and 4) and the custom pivot base 8 (FIGS. 2 and 5) that are operationally anchored to a custom pivot base 8 or a standard golf ball hole pivot base 108.

The custom pivot base 8 (FIG. 5) is a cylinder fitted in a golf ball hole that provides a levelable, stable base for the mounting of the custom golf ball range finder 2. This can be accomplished in various ways. In the preferred embodiment it has a stepped periphery base plate 10 that resides at the bottom of a shallow orifice in the green. The base plate 10 has a series of drain orifices and a central tapered bore. 20 About the stepped perimeter 12 of the base plate 10, a one degree internally tapered circular cylinder 18 is vertically affixed by a set of mechanical fasteners 14 axially passing through threaded bores 16 adjacent the bottom perimeter of the cylinder 18. The height of the cylinder 18 exceeds the depth of the orifice in the green such that when installed, the top peripheral edge of the cylinder 24 extends above the top of the grass line. This allows for the horizontal leveling of the pivot base 2 with a standard bubble or electronic level such that the top peripheral edge is horizontal and the linear axis of the cylinder 18 is vertical.

Figure 5:
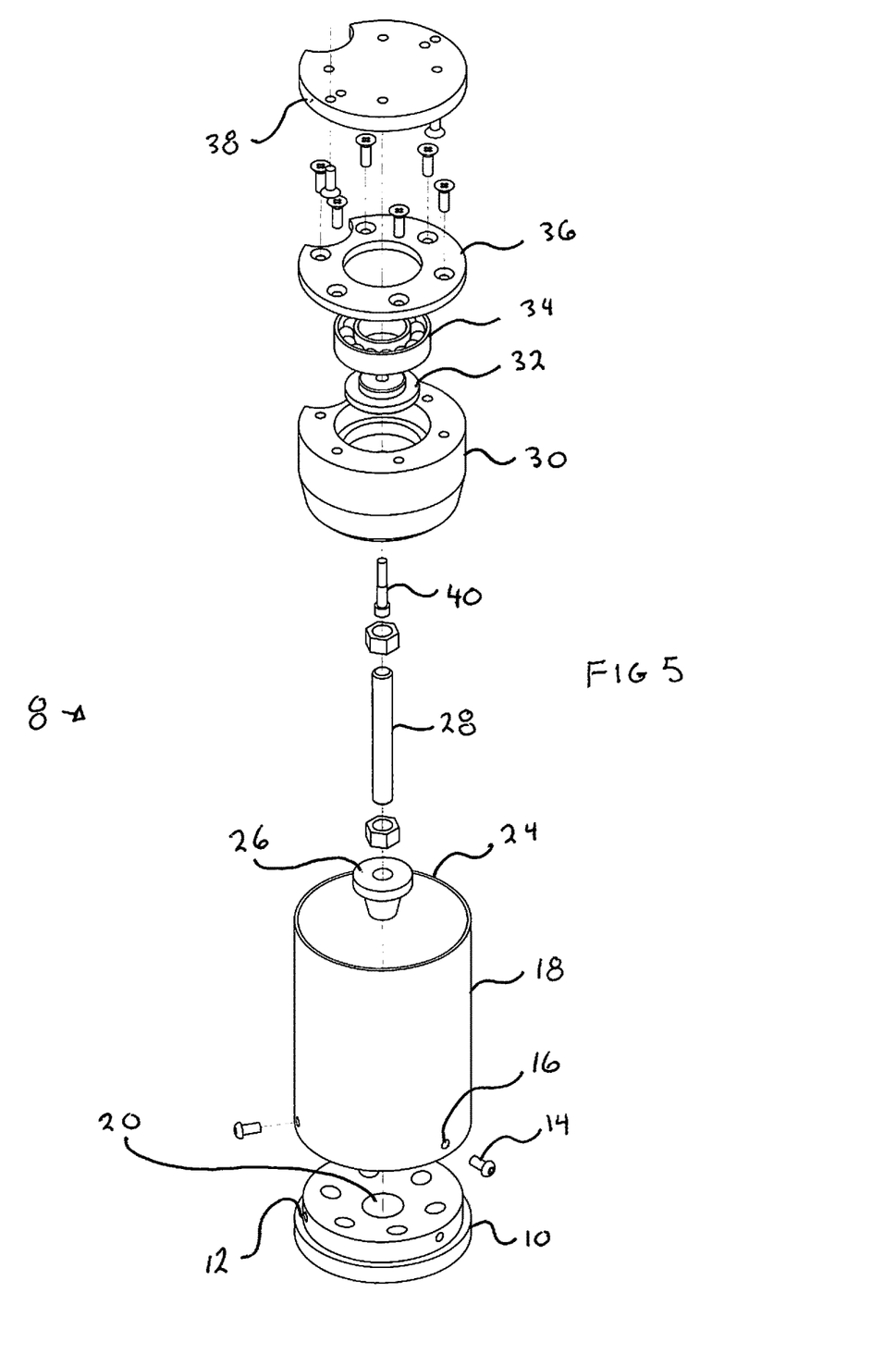
FIG. 5 is an exploded view of the custom pivot base of the golf ball range finder of section 3 of FIG. 2.
Figure 6:
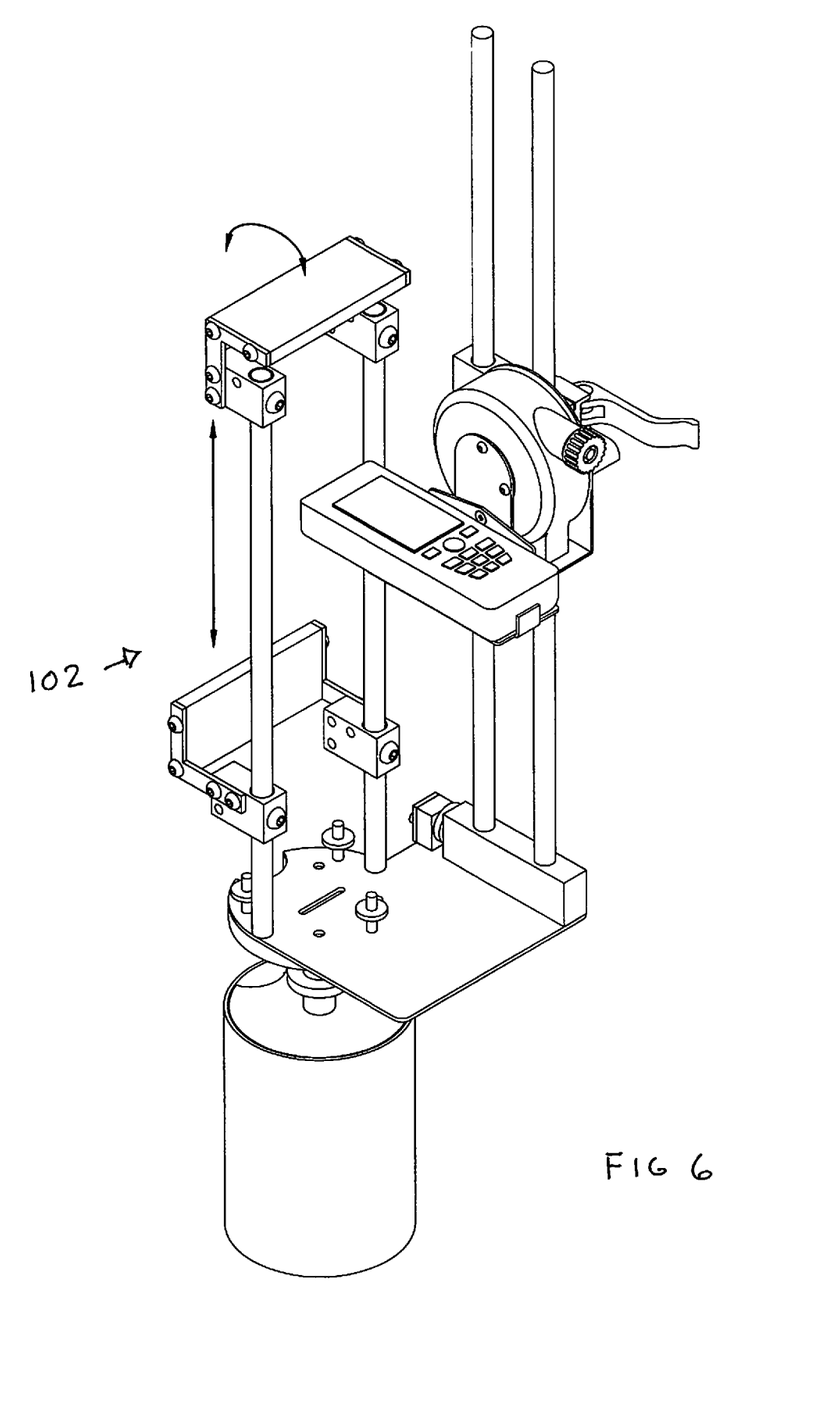
FIG. 6 is a top perspective view of the golf ball ranger finder for use with the standard golf ball hole.

There is a rotational assembly that mounts in the top of the cylinder 18 on which the remainder of the device rests and is free to horizontally rotate about 360 degrees upon. In its simplest configuration, it is a vertically levelable rotational base allowing the device to be centrally located atop of the golf ball hole. In the preferred embodiment, this rotational assembly has a bearing assembly comprised of a bearing retainer body 30 that internally houses a bearing 34 sandwiched by a bearing retainer bottom plate 32 and a bearing retainer top plate 36 that is mechanically affixed to the top face of the bearing retainer body 30. The bearing is held between the bearing retainer bottom plate 32 and bearing retainer top plate 36 by a bearing retainer bolt 40 extending between the plates 32 and 36 and passing through the center of the bearing 36. The mounting plate 38 is mechanically attached at its underside to the bearing retainer top plate 36 and serves as the attachment point for the measurement frame 6 and height adjustment frame 4. The mounting plate 38 has a series of threaded bores formed through its top face for the attachment of the remainder of the device.

The bearing retainer body 30 is located and vertically stabilized on the cylinder 18 by a height adjusting rod 28 threadingly affixed at its distal end to a locating plug 26, and threadingly affixed at its proximal end to the bottom end of the bearing retainer bolt 40. The locating plug 26 has an external taper formed thereon that matingly engages the taper in the central tapered bore 20. The length of the height adjusting rod 28 is manipulated by rotation such that the locating plug 26 rests solidly in the central tapered bore 20 when the bearing retainer 30 rests in the top of the cylinder 18. It is to be noted that the bearing retainer body 30 has a slight taper partially along its vertical face that matches the internal taper in the top of the cylinder 18.

Attached to the custom pivot base is a height adjustment frame. In its simplest configuration, this is a horizontally rotatable plate with vertical rods extending upward therefrom for the vertical attachment and adjustment of the laser range finder and its calibration device (the remainder of the other components of the device). Looking at FIG. 3, the height adjustment frame 4 has a rotational base plate 42 that is bolted to the top of the mounting plate 38. From the rotational base plate 42 vertically extends two substantially parallel laser carriage guide rods 44 held rigidly thereon by a support block 46. There is also a pair of parallel calibration target support rods 48 affixed to the top face of the rotational base plate 42. There is a generally planar calibration platform 49 that engages a pair of height adjusting blocks 50 that each slide vertically along one of the calibration target support rods 48. The height adjusting blocks 50 lock into vertical positions on the support rods 48 by threaded mechanical fasteners passing through axial bores in the height adjusting blocks 50 that contact the sides of the calibration target support rods 48.

Figure 3:
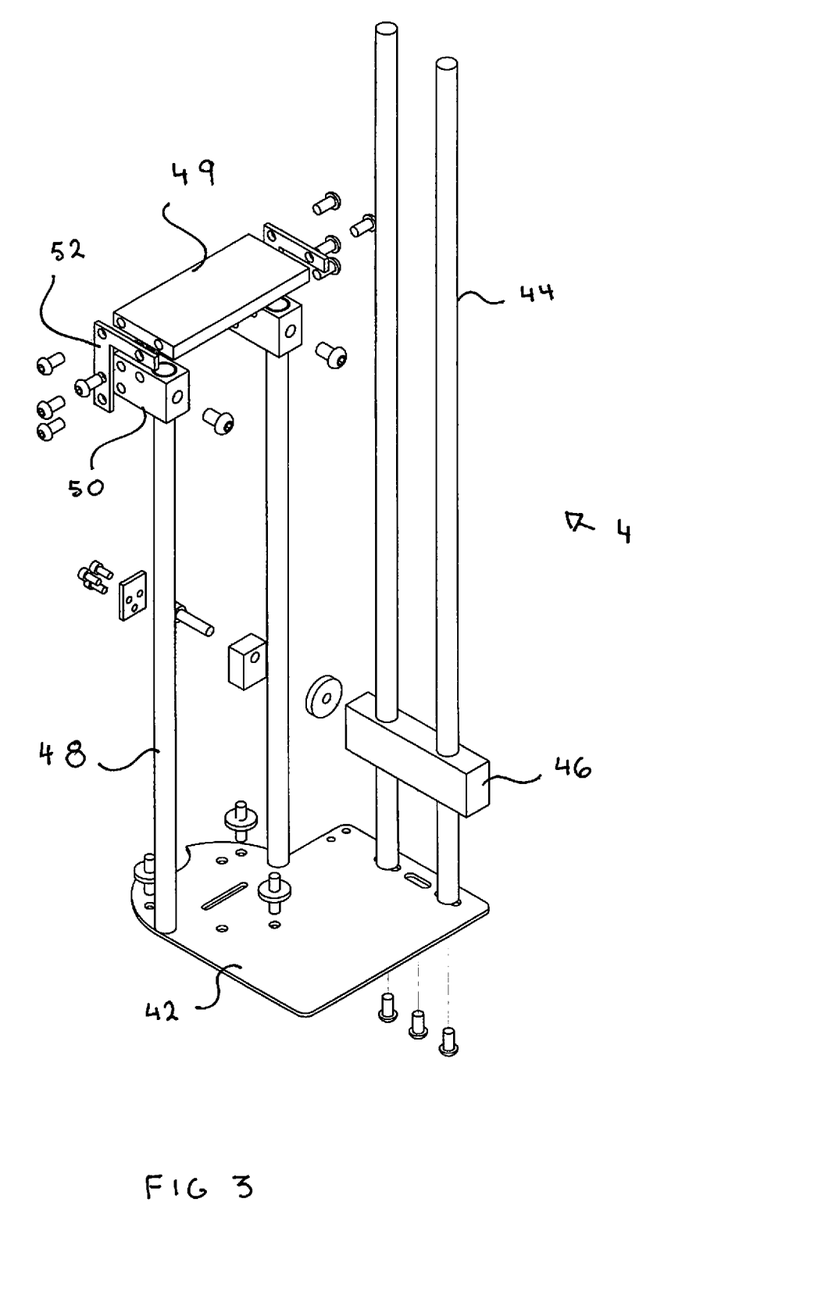
FIG. 3 is an exploded view of the height adjustment frame of the golf ball range finder of section 1 of FIG. 2.

The calibration platform 49 is a vertically adjustable platform mounted in front of the laser range finder that is used as a calibration target for the laser range finder. In its preferred embodiment it is mechanically fastened to the sides of the height adjusting blocks 50 by a pair of L braces 52 so as to constrain the calibration platform 49 in a horizontal configuration parallel to the plane of the rotational base plate 42. The L braces 52 may be repositioned 90 degrees on the adjusting blocks 50 so as to position the calibration platform 49 in the vertical configuration perpendicular to the rotational base plate 42. In the horizontal configuration the calibration platform 49 may be used as a handle to carry and install the device while in the vertical position, the calibration platform 49 may be used as a backdrop for a range calibration as discussed further herein.

The measurement frame 6 (FIG. 4) cradles and raises the laser range finder 54 vertically up and down the laser carriage guide rods 44. It is made of a laser tray 56 sized for the horizontal retention of the laser range finder 4 thereon.

Figure 4:
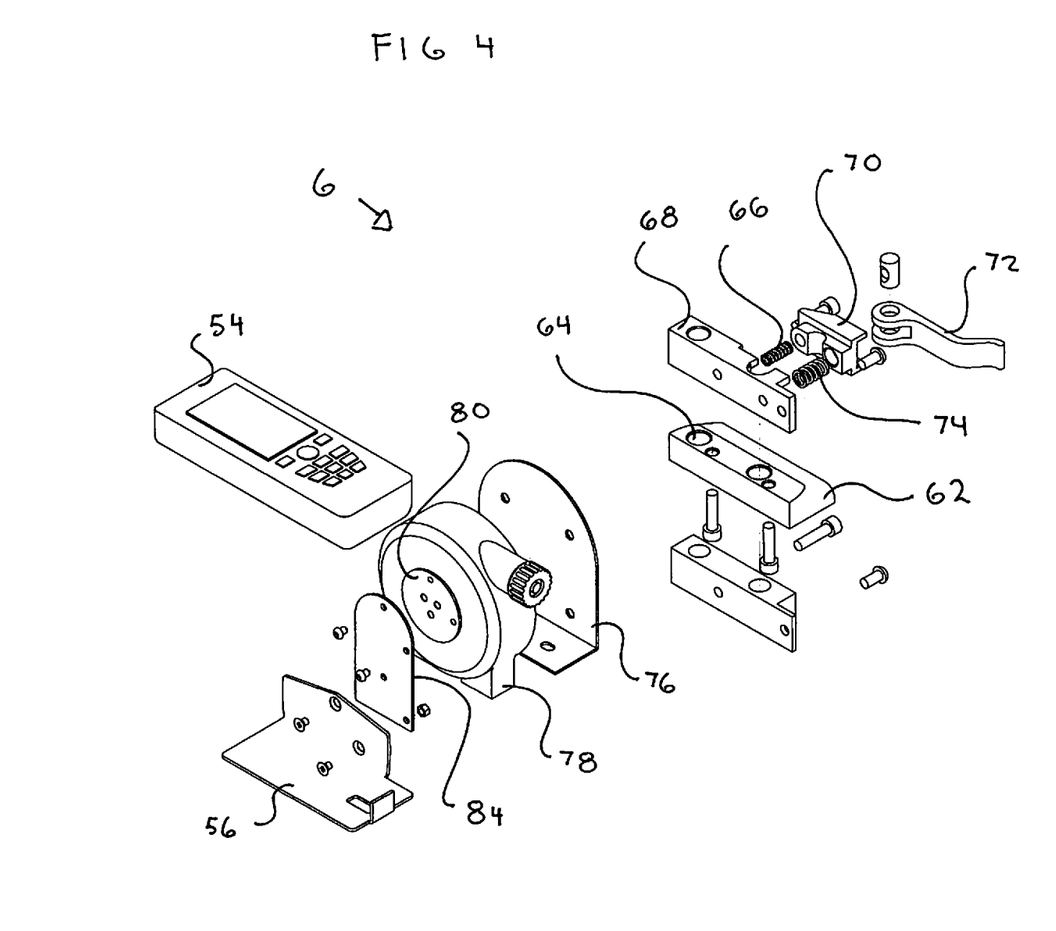
FIG. 4 is an exploded view of the measurement frame of the golf ball range finder of section 2 of FIG. 2.

There is a frictional cam lock assembly 60 with a base 62 that has two through bores 64 that are slidingly mounted mounted on the laser carriage guide rods 44. On the base 62 is mounted an inner lock plate 68 which is connected to an opposing outer lock plate 70. The lock plates each have opposing semicircular grooves formed thereon sized for the frictional engagement about one of the laser carriage guide rods 44. The outer lock plate 70 has a camlock lever 72 affixed on an outer face thereof and the outer lock plate is held in a spaced configuration from the inner lock plate 68 by a pair of compression springs 74 that force the two lock plates apart. When the camlock lever 72 is pivoted, it forces the two lock plates 68 and 70 together to frictionally engage one of the laser carriage guide rods 44 and vertically lock the measurement frame 6.

The inner lock plate 68 is mechanically affixed to the support plate 76 which is affixed to the vertical aiming mechanism 78. The vertical aiming mechanism 78 has a set of internal gears that rotate its angle plate 80 by manipulation of an external thumbwheel 82. The angle plate is on the outer face of the vertical aiming mechanism 78 and is affixed to the laser tray 56 through a connection plate 84. When the angle plate 80 is rotated the laser tray 56 is vertically angled such that the laser beam of the laser range finder 54 may be aligned to an object for a distance determination in conjunction with the rotation of the height adjustment frame 4 on the custom pivot base 8.

In operation, the calibration platform 49 is mechanically fastened to the sides of the height adjusting blocks 50 by a pair of L braces 52 so as to constrain the calibration platform 49 in a horizontal configuration parallel to the plane of the rotational base plate 42. The calibration platform 49 is then used as a handle to transport the custom golf ball range finder 2 to the golf ball hole where the custom pivot base 8 has been installed and aligned vertically with the top peripheral edge of its cylinder 24 slightly higher than the grass line of the green. The measurement frame 6 of the custom golf ball range finder 2 is lowered into the cylinder 24 with their 1 degree tapered side walls coming into full contact. At the same time, the locating plug 26 firmly abuts the central tapered bore 20 in the base plate 10 to add vertical stability to the device. If there is not contact between the locating plug 26 and bore 20 simultaneously with contact between the cylinder 24 and measurement frame 6 the height adjusting rod 28 is threadingly manipulated to adjust the depth of the locating plug 26.

The mechanical fasteners of the calibration platform 49 are removed and the pair of L braces 52 are repositioned such that the calibration platform 49 is in a vertical configuration perpendicular to the plane of the rotational base plate 42. The mechanical fasteners are replaced. The calibration platform 49 is raised vertically on the calibration target support rods 48 until the planar face of the calibration platform 49 blocks the field of vision of the laser range finder 54. Mechanical fasteners are threaded through the height adjusting blocks 50 to contact the support rods 48 and affix the elevation of the calibration platform 49.

The laser range finder 54 is actuated and the distance to the face of the calibration platform 49 is read. The distance between the two is also determined by an internal measurement caliper. Any differences are adjusted in the laser range finder's calibration electronics. With the laser range finder 54 calibrated (generally within 1/1000 inch) the laser tray 54 is raised on the laser carriage guide rods 44 until a circular rotation of the laser on the custom golf ball hole pivot base 8 reveals that its beam can contact the approximate center of all the golf balls. The measurement frame 6 is vertically locked into place with the camlock assembly 60. The vertical aiming mechanism 78 is adjusted to angle the laser tray 56 such that the laser range finder 54 may send its laser beam to the center of each ball in succession. Regardless of the direction the custom golf ball range finder 2 is rotated, since its rotational axis is collinear with the linear axis of the center of the golf ball hole, all measurements to the golf balls originate from a common point and are accurate to 1/1000 of an inch.

Standard golf ball holes are cups placed into shallow orifices in the green. The precise vertical alignment of them is not critical. As such they are not optimized for operation with the preferred embodiment of the custom golf ball range finder 2. Acknowledging that there are situations where a permanent golf ball range finder installed in a custom golf ball hole are not desirable, an alternate embodiment is designed for operation in a standard golf ball hole. This standard golf ball range finder 90 shares many of the same components of the custom golf ball hole golf ball range finder 2, but requires additional components to ensure the golf ball range finder has precise vertical alignment about the vertical centerline of the golf ball hole.

A standard golf ball hole 100 is a one-piece cup with 1 degree internal taper and a right cylindrical flagpole orifice 102 formed there through its bottom. There are different golf ball hole depths. The grounds men do not always install golf ball holes with their top perimeter at the same depth below the grass line of the green or in a perfect vertical orientation. For these reasons, a golf ball range finder for use with a standard golf ball hole must be able to compensate to achieve alignment with a vertical line extending up from the midpoint of the golf ball hole. The structural differences between the custom golf ball range finder 2 and the standard golf ball range finder 90 are minimal but engineered for vertical and horizontal alignment despite the inaccuracies of the golf ball hole placement.

Figure 7:
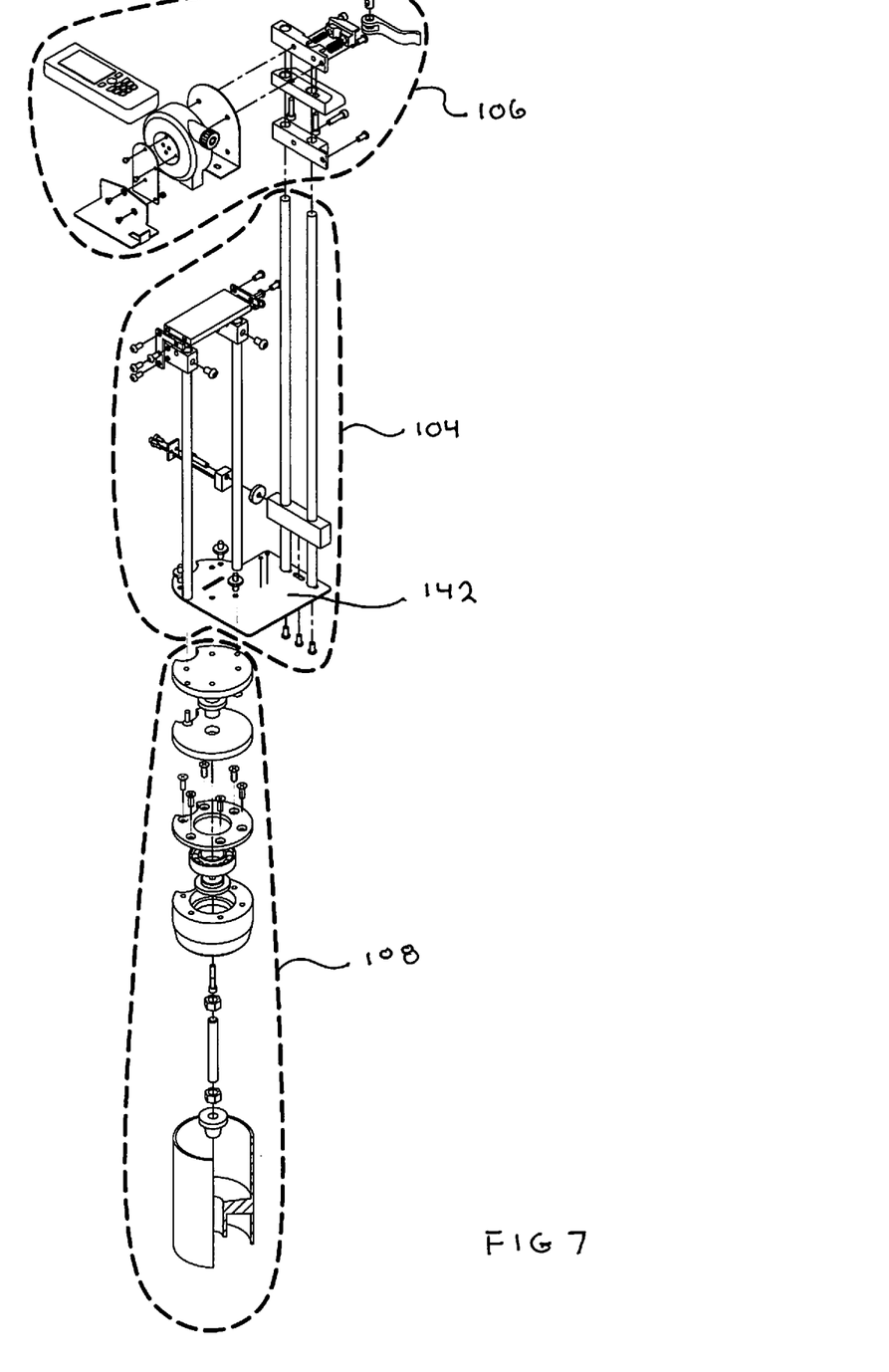
FIG. 7 is an exploded view of the golf ball range finder for use with the standard golf ball hole.
Figure 8:
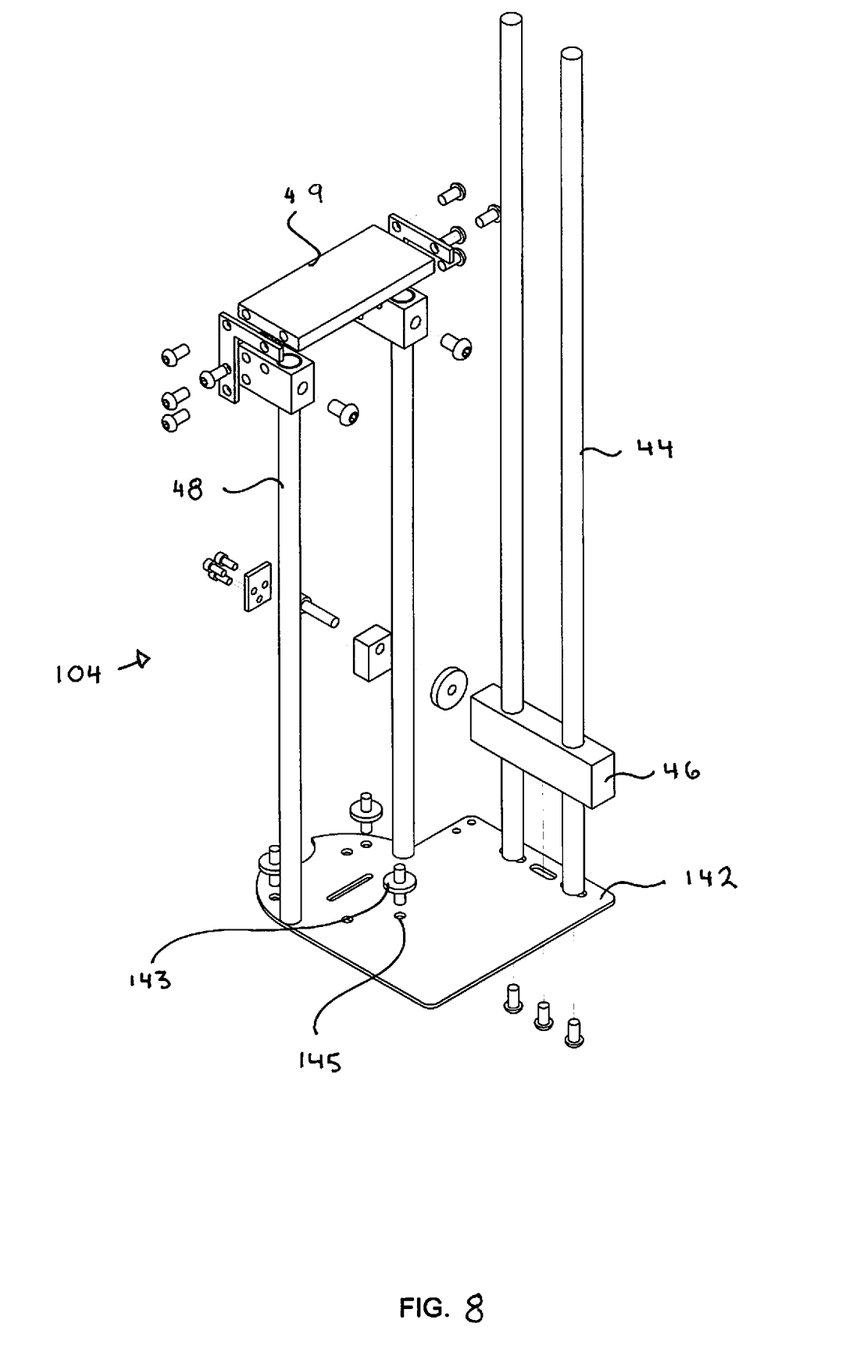
FIG. 8 is an exploded view of the height adjustment frame of the golf ball range finder of section 1 of FIG. 7.
Figure 9:
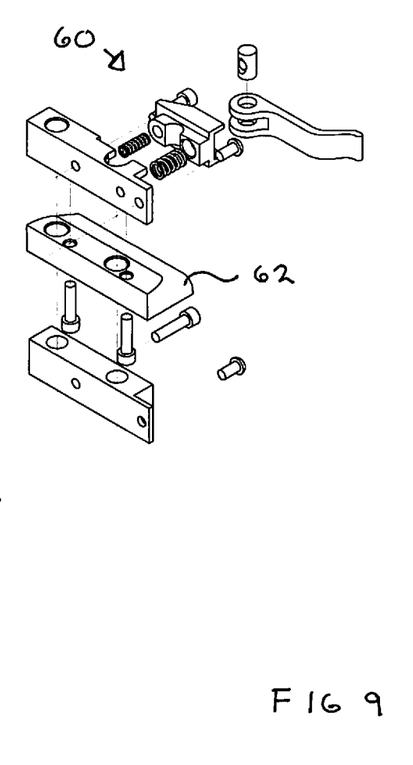
FIG. 9 is an exploded view of the measurement frame of the golf ball range finder of section 2 of FIG. 7.
Figure 10:
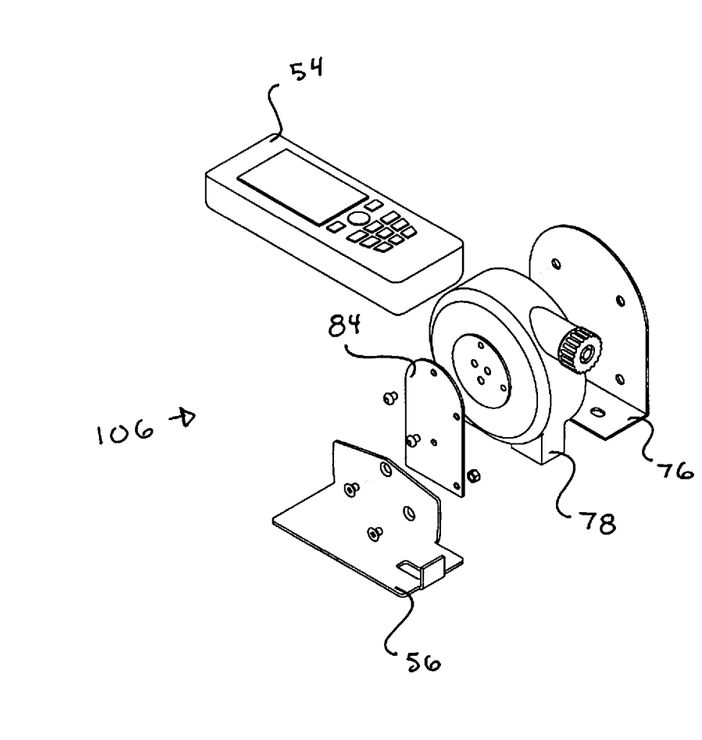
FIG. 10 is an exploded view of the pivot base of the golf ball range finder of section 3 of FIG. 7.

Looking at FIGS. 6-10 the standard golf ball range finder 102 can best be explained. The standard golf ball range finder 102 is made of three separable components: the standard golf ball hole height adjustment frame 104 (FIGS. 7 and 8), the standard golf ball hole measurement frame 106 (FIGS. 7 and 9) and the standard golf ball hole pivot base 108 (FIGS. 7 and 10). The standard golf ball hole measurement frame 106 is substantially similar to the custom golf ball hole measurement frame 4. The standard golf ball hole height adjustment frame 104 differs from the custom golf ball hole height adjustment frame 4 of the custom golf ball hole golf ball range finder 2 only by the addition of a set of leveling screws 143 threadingly engaged through bores 145 in standard golf ball hole rotational base plate 142. These leveling screws 143 are rotated to exert force against the mounting plate 38 of the standard golf ball hole pivot base 108 so as to push the standard golf ball hole rotational base plate 142 into a level horizontal orientation using a standard bubble or electronic level resting on the top face of the mounting plate 38. This will align the vertical rotational axis of the standard golf ball hole height adjustment frame 104 and the standard golf ball hole measurement frame 106 to be collinear with a vertical line passing through the midpoint of the standard golf ball hole 100. This vertical alignment of the height adjustment frame 104 is necessary for accurate measurements from a golf ball to the center of a golf ball hole.

The standard golf ball hole pivot base 108 incorporates an adjustable height mechanism for raising the mounting plate 38 to accommodate standard golf ball holes 100 that are set too deep into the green. In these cases, without height correction the standard golf ball hole pivot base 108 would not be able to rotate. This feature is not necessary with a custom golf ball hole that has been vertically, horizontally and depth aligned. These physical differences can best be seen in FIG. 10.

Abutting the bottom face of the mounting plate 38 is the flange 110 of an adjustable rizer 109. This adjustable rizer 110 is a rod threaded at its distal end and a planar flange 110 formed on its proximal end. The distal end is threadingly engaged in a threaded through bore 112 in a rizer base plate 114 that resides on and above the bearing retainer top plate 36. Mechanical fasteners pass through orifices in the rizer base plate 114 and retainer base plate 36 and thread into bearing retainer body 30. The liner axis of the rizer 110 passes through the midpoint of the bearing retainer top plate 36 and bearing 34 so as to allow for a rizer 110 with a rod length to accommodate a substantial range of height adjustment.

The operation of the standard golf range finder 90 is identical to that of the preferred embodiment earlier disclosed with the exception of two things: raising the height of the mounting plate 38 of the standard golf ball hole pivot base 108, and the vertical alignment of the height adjustment frame 104.

While certain features and aspects have been described with respect to exemplary embodiments, one skilled in the art will recognize that numerous modifications are possible. System components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

The invention claimed is:

1. A golf ball range finder for determination of the distance of a golf ball from the center of a golf ball hole, comprising:
   a 360 degree rotatable pivot base;
   a height adjustment frame coupled to said pivot base, said height adjustment frame having a vertical, rotational axis;
   a measurement frame housing a vertically angularly adjustable laser range finder, said measurement frame affixed to said height adjustment frame; and
   a custom golf ball hole with a vertical axis and having a one degree side wall taper and a central tapered bore formed at a bottom thereon.

2. The golf ball range finder of claim 1 wherein said custom golf ball hole is an internally tapered cylinder affixed to a base plate with said centrally tapered bore formed therein, wherein said internally tapered cylinder has a horizontal top peripheral edge.

3. The golf ball range finder of claim 2 wherein said rotatable pivot base has a bearing assembly with a distal end of a height adjusting rod extending centrally therefrom, said height adjusting rod having a proximal end with a locating plug residing in matingly tapered said tapered bore.

4. The golf ball range finder of claim 1 where the vertical, rotational axis of said height adjustment frame is collinear with the linear axis of said custom golf ball hole.

5. The golf ball range finder of claim 2 wherein said measurement frame has at least one laser carriage guide rod extending vertically therefrom with a camlock assembly sliding mounted thereon, said camlock assembly connected to a vertical aiming device which is affixed to a laser tray, said camlock assembly adapted for locking said laser tray in different angles between the horizontal and vertical axis.

6. The golf ball range finder of claim 3 further comprising a vertical aiming mechanism affixed to said laser tray, said vertical aiming device adapted to adjust the angle of said laser between a horizontal and a vertical axis.

7. The golf ball range finder of claim 1 wherein said golf ball hole has a midpoint.

8. The golf ball range finder of claim 7 where said vertical, rotational axis of said height adjustment frame passes through said midpoint of said golf ball hole.

9. The golf ball range finder of claim 8 wherein said rotatable pivot base has a bearing assembly with a distal end of a height adjusting rod extending centrally therefrom, said height adjusting rod having a proximal end with a locating plug for insertion into a bottom orifice of a golf ball hole formed thereon.

10. The golf ball range finder of claim 9 further comprising a least one leveling screw threadingly engaged between said height adjustment frame and said pivot base.

11. The golf ball range finder of claim 10 further comprising an adjustable height mechanism comprising an adjustable rizer threadingly engaged into a rizer base plate supported on said bearing assembly, said adjustable rizer contacting a bottom of said height adjustment frame.

12. The golf ball range finder of claim 11 wherein said measurement frame has at least one laser carriage guide rod extending vertically therefrom with a camlock assembly sliding mounted thereon, said camlock assembly connected to a vertical aiming device which is affixed to a laser tray, said camlock assembly adapted for locking said laser tray in different angles between the horizontal and vertical axis.

13. The golf ball range finder of claim 12 further comprising a vertical aiming mechanism affixed to said laser tray, said vertical aiming device adapted to adjust the angle of said laser between a horizontal and a vertical axis.

14. A golf ball range finder for determination of the distance of a golf ball from the center of a golf ball hole, comprising:
   a 360 degree rotatable pivot base;
   a height adjustment frame coupled to said pivot base, said height adjustment frame having a vertical, rotational axis;
   a measurement frame housing a vertically angularly adjustable laser range finder, said measurement frame affixed to said height adjustment frame; and
   a custom golf ball hole with a vertical axis and a tapered side wall.

15. The golf ball range finder of claim 14 further comprising a central bore formed at a bottom of said custom golf ball hole.

* * * * *